July 5, 1932. A. J. LAING 1,865,926
JUNCTION BOX
Filed Nov 5, 1930 2 Sheets-Sheet 1
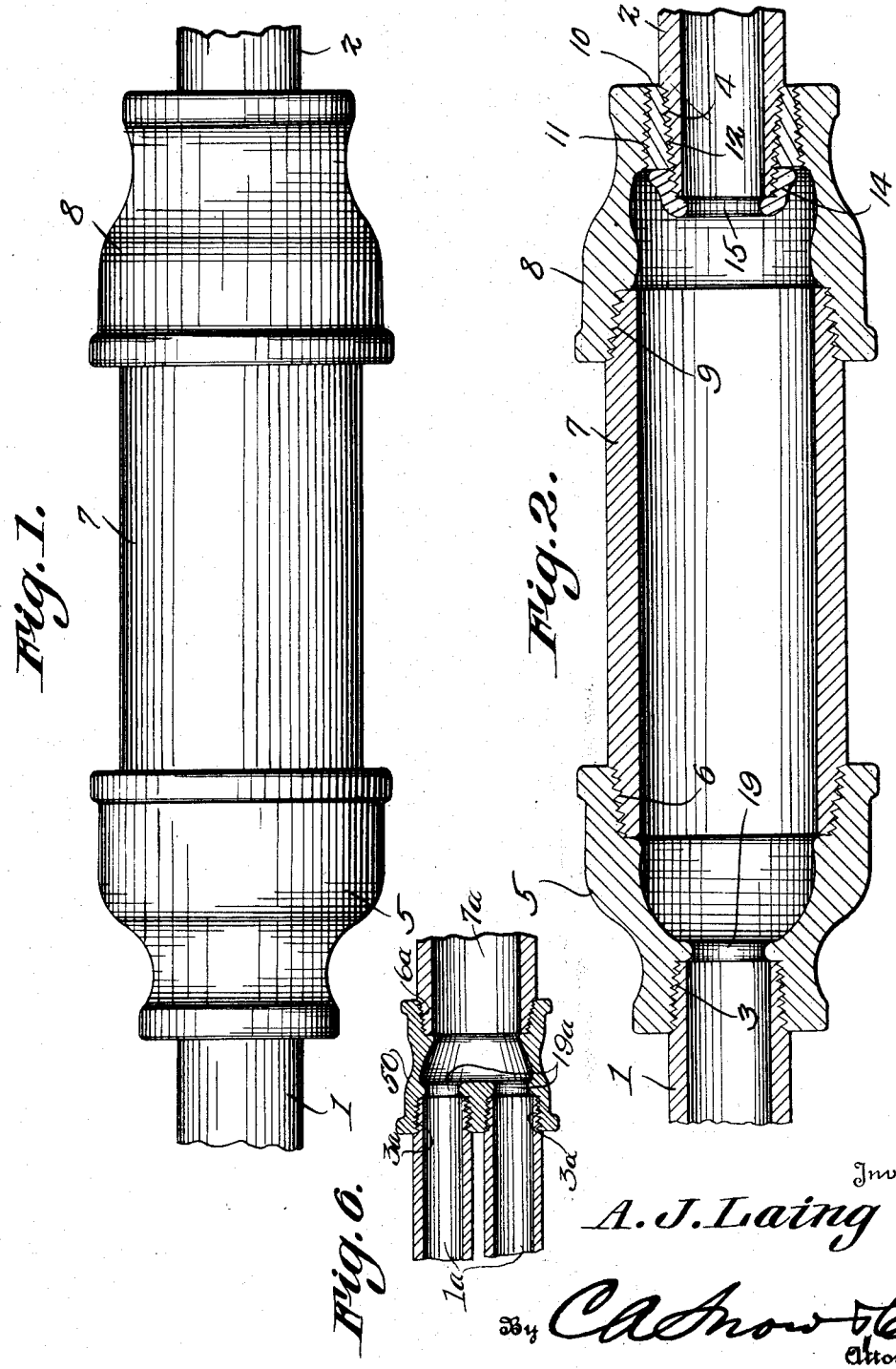
Inventor
A. J. Laing
By C. A. Snow & Co.
Attorneys.

July 5, 1932. A. J. LAING 1,865,926
JUNCTION BOX
Filed Nov 5, 1930 2 Sheets-Sheet 2
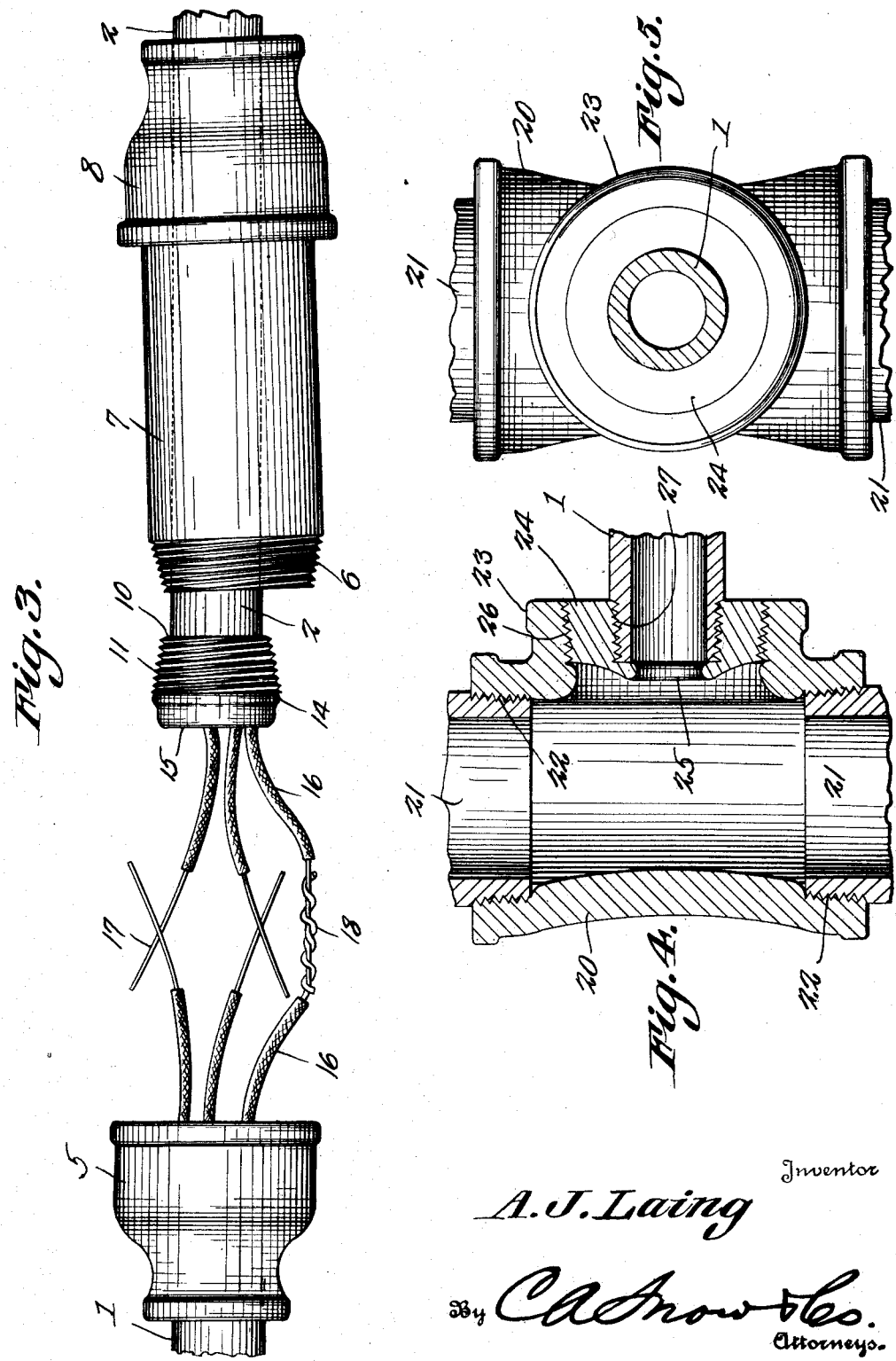
Inventor
A. J. Laing
By C. A. Snow & Co.
Attorneys.

Patented July 5, 1932

1,865,926

UNITED STATES PATENT OFFICE

ARTHUR J. LAING, OF DEARBORN, MICHIGAN

JUNCTION BOX

Application filed November 5, 1930. Serial No. 493,628.

This invention aims to provide a conduit for wires, the conduit being so constructed that it can be taken down readily, to facilitate the splicing of the wires, the device being cheap to make and easy to manipulate, it being possible to remove parts of the conduit completely from the wires which are to be spliced, the article being compact, small and of good external appearance.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Figure 1 shows in elevation, a device constructed in accordance with the invention;

Figure 2 is a longitudinal section;

Figure 3 is an elevation of the device hereinafter described, the parts of it being separated for the splicing of wires;

Figure 4 is a section of one of the couplings and attendant parts;

Figure 5 is an elevation of the structure shown in Figure 4, the pipe being in section.

Figure 6 is a fragmental longitudinal section showing a modification.

The numeral 1 marks a first pipe, and the numeral 2 marks a second pipe, these pipes and parts hereinafter mentioned, forming a conduit in which are located wires that are to be spliced. The pipe 1 has a tapered, threaded end 3, and the pipe 2 has a tapered threaded end 4.

The numeral 5 designates a first coupling, which may be in the form of a reducer. The end 3 of the pipe 1 is threaded into the outer end of the coupling 5. Into the inner end of the coupling 5 is threaded the tapered end 6 of a tube 7 which may be of somewhat greater diameter than the pipes 1 and 2. The tube 7 has a tapered, threaded end 9 engaged with the inner end of a second coupling 8.

Into the outer end of the second coupling 8 is threaded a ring 10, as shown at 11. The second pipe 2 is threaded at 12 into the ring 10 and extends inwardly a little way beyond the inner end surface of the ring 10. The ring 10 is of blunted wedge shape, in cross section, its narrower end being disposed adjacent to the outer end of the second coupling 8. This construction facilitates the mounting of the ring 10 on the pipe 2, and also facilitates the backing-off of the coupling 8, as shown in Figure 3.

The numeral 14 indicates an annular retainer and guide which is threaded on the extreme inner end of the second pipe 2. The part 14 is called a retainer because it abuts against the inner end of the ring 10 and prevents the ring from being displaced inwardly. The ring or member 14 is called a guide because it has, upon its inner end, an annular rib 15, which is rounded transversely, the rib projecting inwardly towards the axis of the pipe 2, beyond the wall of the bore of the pipe, so as to limit wear on the wires in the conduit. The wires are shown at 17, the insulation upon them appears at 16, and the numeral 18 designates a joint, of any desired kind which is made in one or more of the wires.

The first coupling 5 is provided with an inwardly extended, annular rib 19, which is transversely rounded. This rib extends inwardly toward the axis of the first pipe 1, beyond the wall of the bore of the said pipe. The rib 19 serves as a guide, because, being rounded transversely, it limits the wear on the insulation 16 of the wires 17 in the conduit, the rib 19 cooperating with the rib 15 of the member 14 in producing the result mentioned. The rib 19 forms a retainer, in that the inner end of the pipe 1 abuts against it.

When it is desired to have access to the wires 17 in order to make the splice 18, or for any other purpose, the coupling 8, carrying with it the tube 7, is threaded off the ring 10 and out of the coupling 5, the coupling 8 and the tube 7 being carried to the right, into the position of Figure 3, thereby exposing the wires 17.

The numeral 20 marks a coupling, in the form of a T. Pipes 21 are threaded into the ends of the body of the T, the pipes having tapered, threaded ends 22 for the purpose specified. Into the shank 23 of the T coupling 20 is threaded a ring 24 provided at its inner end with an annular guide rib 25 which is transversely rounded, the rib 25 extending inwardly toward the axis of the pipe 1, beyond the wall of the bore of the pipe, as and for the purpose hereinbefore specified. The inner end of the pipe 1 abuts against the rib 25, and the rib 25, therefore, like the ribs 19 and 15, forms both a wire guide and a retainer. The structure shown in Figure 4 is used when it is desired to have lateral branches for the wires in the conduit.

Although the coupling 20 has been shown as mounted on the end of the pipe 1, it will be understood that the coupling 5 of Figure 2 may be dispensed with, the end 6 of the tube 7 being mounted directly in the ring 24, in place of the pipe 1 as shown in Figure 4. An illustration of this change in the set-up is not necessary, because a figure showing it would be like Figure 4, aside from the fact that the pipe 1 would be shown a little larger in diameter, to represent the tube.

The device shown in the drawings, hereinbefore described, and hereinafter claimed, will be found highly advantageous in opening conduits to provide for the splicing of wires.

The threads shown at 3, 6, 9, 11, 12, 22, 26 and 27, and in the corresponding places in the modification shown in Figure 6, are right-hand threads.

Referring to the modification shown in Figure 6, parts hereinbefore described have been designated by numerals previously used, with the suffix "a".

The coupling 5a is not a reducer, as is the part 5, but terminates at its outer end in an enlarged bell 50 having separate openings, into which two or more pipes may be threaded.

Having thus described the invention, what is claimed is:

In a conduit adapted to be opened for the splicing of wires therein, first and second couplings, a tube having its ends threaded into the inner ends of the couplings, a ring threaded into the outer end of the second coupling, a pipe threaded into the ring, an annular retainer and guide threaded on the outside of the inner end of the pipe and cooperating with the ring to stop the inward movement of the ring, the retainer and guide having an annular rounded rib which overlaps the inner end surface of the pipe, and another pipe threaded into the outer end of the first coupling.

In testimony that I claim the foregoing as my own, I have hereto affixed my signature.

ARTHUR J. LAING.